(12) United States Patent
Li et al.

(10) Patent No.: US 8,331,247 B2
(45) Date of Patent: Dec. 11, 2012

(54) METHOD FOR CODE CHANNEL ALLOCATION AND METHOD FOR MULTIUSER DETECTION IN A WIRELESS COMMUNICATION SYSTEM

(75) Inventors: Feng Li, Shanghai (CN); Guiliang Yang, Shanghai (CN); Shaoli Kang, Shanghai (CN)

(73) Assignee: Shanghai Ultimate Power Communications Technology Co., Ltd., Shanghai (CN)

( * ) Notice: Subject to any disclaimer, the term of this patent is extended or adjusted under 35 U.S.C. 154(b) by 1026 days.

(21) Appl. No.: 11/914,358

(22) PCT Filed: May 10, 2006

(86) PCT No.: PCT/CN2006/000936
§ 371 (c)(1),
(2), (4) Date: Jun. 20, 2008

(87) PCT Pub. No.: WO2006/119704
PCT Pub. Date: Nov. 16, 2006

(65) Prior Publication Data
US 2009/0129360 A1 May 21, 2009

(30) Foreign Application Priority Data
May 13, 2005 (CN) .......................... 2005 1 0069282

(51) Int. Cl.
*G08C 15/00* (2006.01)
(52) U.S. Cl. ........ 370/252; 370/320; 370/335; 370/342; 370/441; 370/347; 370/348; 370/349
(58) Field of Classification Search .................. 370/252, 370/320, 335, 342, 441; 375/346, 347, 348, 375/349
See application file for complete search history.

(56) References Cited

U.S. PATENT DOCUMENTS

| 6,381,260 | B1 * | 4/2002 | Bahrenburg et al. | ......... 375/130 |
| 6,618,428 | B2 * | 9/2003 | Jechoux et al. | ............... 375/141 |

(Continued)

FOREIGN PATENT DOCUMENTS

CN 1352838 6/2002

(Continued)

OTHER PUBLICATIONS

Korean Notice of Office Action, dated Mar. 3, 2010, 6 pages (English translation).

(Continued)

*Primary Examiner* — Bo Hui A Zhu
(74) *Attorney, Agent, or Firm* — Andrew F. Young, Esq.; Lackenbach Siegel, LLP (57) ABSTRACT

The present invention discloses a method for code channel allocation and related multiuser detection in a wireless communication system. The method for code channel allocation includes: establishing a relation between at least one channel estimation window and a channelization code, wherein the at least one channel estimation window corresponding to the channelization code includes the channel estimation windows corresponding to all the spread spectrum code branches of a node in which the channelization code exists; and performing code channel allocation according to the relation established. In the method for code channel allocation of the invention, there exists a one-to-many relation between the channelization code/channelization code number established and the at least one channel estimation window. Therefore, during the multiuser detection, the channelization code/channelization code number determined via the at least one channel estimation window activated is unique. Thereby, the efficiency of the multiuser detection process may be increased.

14 Claims, 6 Drawing Sheets

U.S. PATENT DOCUMENTS

| | | | |
|---|---|---|---|
| 2001/0046221 A1 | 11/2001 | Ostman et al. | |
| 2002/0006122 A1* | 1/2002 | Zeira | 370/335 |
| 2002/0110099 A1 | 8/2002 | Zeira et al. | |
| 2004/0146024 A1* | 7/2004 | Li et al. | 370/334 |

FOREIGN PATENT DOCUMENTS

| | | |
|---|---|---|
| CN | 1430356 | 7/2003 |
| CN | 1474530 | 2/2004 |
| EP | 1 404 034 A3 | 4/2004 |
| JP | 2004503985 | 2/2004 |
| JP | 2007514381 | 5/2007 |
| JP | 2008541580 | 11/2008 |
| WO | WO 01/72070 | 9/2001 |

OTHER PUBLICATIONS

European Search Report, Appln. No. 06741829.3 dated Jun. 14, 2010, 7 pages.

"Signaling Support Joint Detection Mechanism in Downlink TD-SCDMA", Oct. 11, 2004, XP-002328627, Yueheng Li, Xuejun Zhang, Ni Ma and Gang Wu, Philips research East Asia, Section I, Introduction, Figure 5.

Japanese Office Action, Appln. Serial No. 2008-510384 dated Aug. 3, 2010, 3 pages—Japanese, 4 pages—English translation.

* cited by examiner

Fig.1

PRIOR ART

METHOD FOR CODE CHANNEL ALLOCATION AND METHOD FOR MULTIUSER DETECTION IN A WIRELESS COMMUNICATION SYSTEM

CROSS REFERENCE TO RELATED APPLICATIONS

This application claims priority to PCT/CN2006/00936 filed May 10, 2006 which in turn claims priority from CN 200510069282.1 filed May 13, 2005.

FIELD OF THE INVENTION

The present invention relates to the field of wireless communications, in particular, to a method for code channel allocation and a method for multiuser detection in a Code Division Multiple Access (CDMA) communication system.

BACKGROUND OF THE INVENTION

For a mobile communication system of CDMA mode, because of the coexistence of multiuser in the same channel and the complexity of the wireless environment, when a receiver receives an expected signal, it is inevitable that the signal is influenced by Fading, Multi-Access Interference (MAI) and Inter Symbol Interference (ISI). In the Multi-User Detection (MUD) method, the interference signal can be used effectively and interference may be eliminated or weakened via de-spread and multiuser joint channel equalization, so that the system performance may be improved greatly.

Before a multiuser detection is performed, the receiver should preknow the channelization code of the user accessed in the current time slot. Usually, the channelization code is obtained in the following way: the receiver predetects the channel estimation window that is activated, then finds the corresponding channelization code using the relation between the channel estimation window and the channelization code that is established during the code channel allocation process, and performs the multiuser detection using the code channel in which the channelization code exists.

In the existing Time Division Duplex Mode of CDMA (TDD-CDMA) communication system, there are three methods for code channel allocation: specific assigned allocation mode (Specific), default allocation mode (Default) and common allocation mode (Common). In the Specific mode, the relation between the channelization code and the channel estimation window is informed by an upper layer, a plurality of channelization codes that belong to the same user occupy the same channel estimation window, and the window position is designated randomly. In the Default mode and the Common mode, the relation between the channelization code and the channel estimation window is defined according to a default rule. Because the allocation of the Specific mode is too flexible and extra signaling information is required, it is usually not adopted in the practical system development. Here, the method for code channel allocation will be illustrated with respect to the Default mode and the Common mode.

In the Default allocation method, a plurality of channelization codes of the same user occupy one or more channel estimation windows, and the position of the estimation window is related to the channelization code. In the Common allocation method, a plurality of channelization codes of all the users occupy the same channel estimation window, and the position of the channel estimation window is related to the channelization code number. The Default allocation method may be applied to an uplink or a downlink, while the Common allocation method can only be applied to a downlink.

The code channel allocation in the Default mode and the code channel allocation in the Common mode will now be illustrated by taking the case in which the maximum number of channel estimation windows is 8 (i.e., K=8) as an example.

Figure 1:
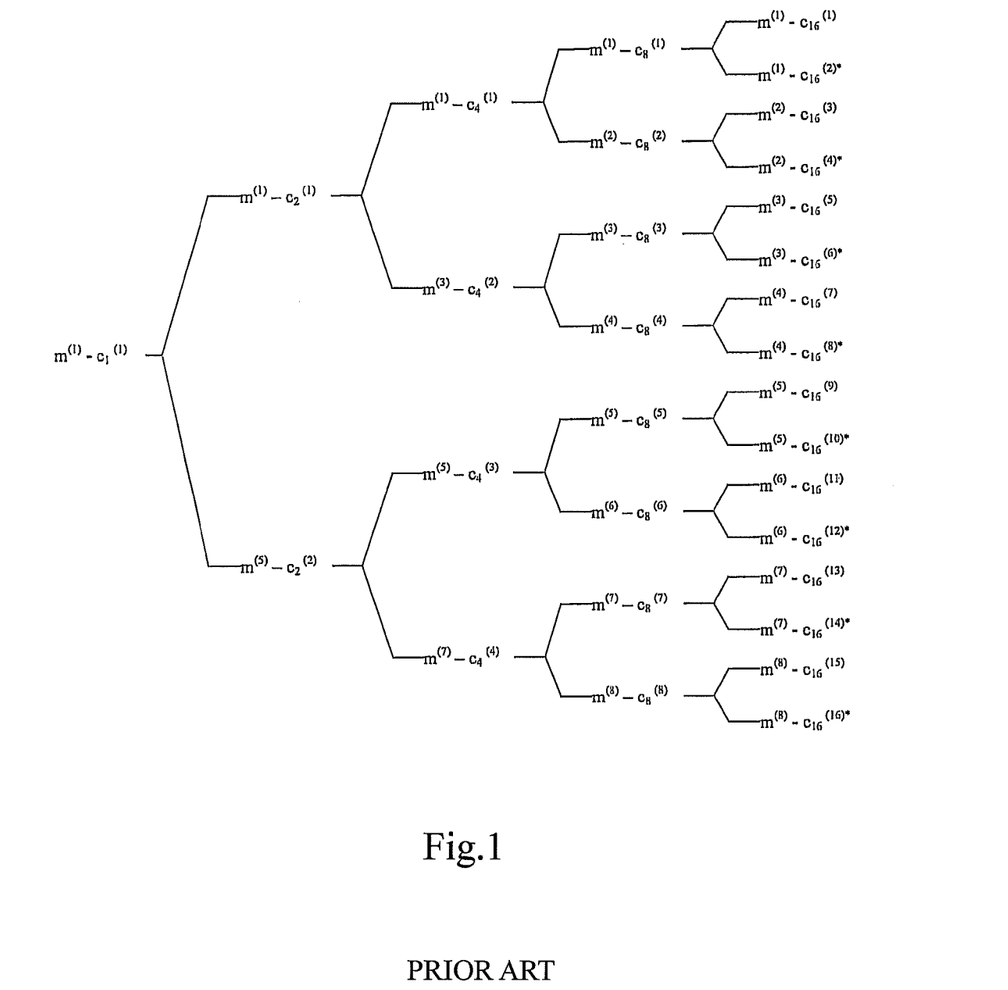
FIG. 1 is a schematic diagram of the code channel allocation in the Default mode when K=8 in the existing standard.

Referring to FIG. 1, it is a schematic diagram of the code channel allocation in the Default mode when K=8. Wherein, $m^{(i)}$ is the $i^{th}$ channel estimation window, $c_j^{(i)}$ is the $i^{th}$ channelization code with a spread factor of j ($1<=i<=j$). It can be seen from FIG. 1(a) that the same channel estimation window position corresponds to a plurality of channelization codes, and the plurality of channelization codes may have the same spread factor (parallel walsh branch), or they may have different spread factors (home walsh branch). For example, the first channel estimation window ($m^{(1)}$) corresponds to $c_{16}^{(1)}$, $c_{16}^{(2)}$, $c_8^{(1)}$, $c_4^{(1)}$, $c_2^{(1)}$ and $c_1^{(1)}$ at the same time, where $c_{16}^{(1)}$ and $c_{16}^{(2)}$ are both parallel walsh branches whose spread factor is 16; $c_{16}^{(1)}$, $c_8^{(1)}$, $c_4^{(1)}$, $c_2^{(1)}$ and $c_1^{(1)}$ are home walsh branches whose spread factors are 16, 8, 4, 2 and 1 respectively; $c_{16}^{(1)}$ and $c_{16}^{(2)}$ belong to $c_8^{(1)}$, $c_8^{(1)}$ belongs to $c_4^{(1)}$, $c_4^{(1)}$ belongs to $c_2^{(1)}$, and $c_2^{(1)}$ belongs to $c_1^{(1)}$.

Referring to Table 1, it is a schematic table showing the code channel allocation in the Common mode when K=8.

TABLE 1

| m1 | m2 | m3 | m4 | m5 | m6 | m7 | m8 |          |
|----|----|----|----|----|----|----|----|----------|
| 1  | 0  | 0  | 0  | 0  | 0  | 0  | 0  | 1 or 9 codes |
| 0  | 1  | 0  | 0  | 0  | 0  | 0  | 0  | 2 or 10 codes |
| 0  | 0  | 1  | 0  | 0  | 0  | 0  | 0  | 3 or 11 codes |
| 0  | 0  | 0  | 1  | 0  | 0  | 0  | 0  | 4 or 12 codes |
| 0  | 0  | 0  | 0  | 1  | 0  | 0  | 0  | 5 or 13 codes |
| 0  | 0  | 0  | 0  | 0  | 1  | 0  | 0  | 6 or 14 codes |
| 0  | 0  | 0  | 0  | 0  | 0  | 1  | 0  | 7 or 15 codes |
| 0  | 0  | 0  | 0  | 0  | 0  | 0  | 1  | 8 or 16 codes |

It can be seen from Table 1 that a channel estimation window position corresponds to a plurality of channelization code numbers. For example, the first channel estimation window ($m^{(1)}$) corresponds to 1 or 9 channelization codes at the same time.

In the existing communication process, the receiver of a base station is preinformed of the code channel allocation information of the current accessed user, and the receiver of a terminal also knows its own code channel allocation information. In the Default mode, if the practical transmitted code channel is the code channel allocated, the receiver performs a multiuser detection directly with the allocation information that is known. However, during the practical transmission process, on one hand, because the traffic varies from high to low, part of the code channels allocated are not involved in transmission; on the other hand, due to the complexity of transmitting beamforming and wireless environment, part of the transmission code channels suffer from severe attenuation and fading, thus a situation may be caused in which the code channels that actually need to participate in detection on the receiving end are different from the code channels allocated. In such a case, the receiver cannot know exactly the code channels that are involved in transmission and the fading status. Thereby, difficulty may be brought about for the multiuser detection: computational complexity should be increased in order to find the code channels that are involved in transmission practically but are not weakened by fading (i.e., the code channels that need to participate in the multiuser detection).

In the Common mode, the receiver cannot know the exact number of the transmitted code channel with the predetected channel estimation window that is activated. For example, in FIG. 1(b), supposing that the transmitting end occupies 1 channel estimation window for information transmission, and the receiver performs channel estimation using a training sequence and obtains the channel estimation window $m^{(1)}$ that is activated. In the Common mode, although the first channel estimation window ($m^{(1)}$) corresponds to 1 or 9 channelization codes at the same time in the code channel allocation, the receiver usually performs multiuser detection with the maximum channelization code number so as to avoid the situation that a user may be missed out. In other words, the receiver performs multiuser detection with 9 code channels. Thereby, 8 interfering code channels are introduced, so that the complexity of multiuser detection is increased greatly and the performance of multiuser detection is lowered.

SUMMARY OF THE INVENTION

Therefore, the embodiments of the present invention provide a method for code channel allocation and a method for multiuser detection in a wireless communication system, by means of which the problem during the existing code channel allocation process that the multiuser detection is complex due to the many-to-one relation between the channelization code/channelization code number and the channel estimation window may be solved.

The invention provides a method for code channel allocation in a wireless communication system, which includes:

establishing a relation between at least one channel estimation window and a channelization code, wherein the at least one channel estimation window corresponding to the channelization code comprises at least one channel estimation window corresponding to all the spread spectrum code branches of a node in which the channelization code exists; and performing code channel allocation according to the relation established.

The method includes: establishing the relation between the at least one channel estimation window and the channelization code in the case that a maximum number of the channel estimation windows K=16;

when a spread factor is 16, establishing a one-to-one relation between the channelization code and the channel estimation window;

when the spread factor is not 16, establishing a relation between each channelization code and several channel estimation windows, wherein the channel estimation windows comprise the channel estimation windows of all the sub-spread spectrum code branches of the spread spectrum code branch in which the node exists.

A relation between the at least one channel estimation window and the channelization code is established in the case that the maximum number of the channel estimation windows K=8;

when the spread factor is 16, establishing a relation between each channel estimation window and two channelization codes; and when the spread factor is not 16, establishing a relation between each channelization code and several channel estimation windows, wherein the several channel estimation windows comprise the channel estimation windows of all the sub-walsh branches of a walsh branch in which the node exists. In the process of establishing the relation between each channel estimation window and two channelization codes, a channel estimation window $m^{(i)}$ corresponds respectively to two channelization codes $C_{16}^{(2i-1)}$ and $C_{16}^{(2i)}$ whose sequence numbers are adjacent, wherein i is the sequence number of the channel estimation window.

A relation between the at least one channel estimation window and the channelization code is established when K is any even number between 2-16;

when the spread factor is 16, establishing a one-to-one relation between K channel estimation windows and K channelization codes first, then extracting at least 1 channel estimation window from the K channel estimation windows to establish a relation with the remaining 16−K channelization codes;

when the spread factor is not 16, establishing a relation between each channelization code and several channel estimation windows, wherein the channel estimation windows comprise the channel estimation windows of all the sub-spread spectrum code branches of a spread spectrum code branch in which the node exists, wherein K is the maximum number of channel estimation windows According to the invention, there is further provided a method for multiuser detection, which includes:

1) establishing a relation between at least one channel estimation window and a channelization code, performing code channel allocation according to the relation, and saving information of a code channel allocated on a transmitting end and a receiving end respectively, wherein the at least one channel estimation window corresponding to the channelization code comprises the channel estimation windows occupied by all the sub-spread spectrum code branches of a node in which the channelization code exists;

2) receiving, by a receiving end, a wireless signal containing multiple users, and extracting a training sequence from the wireless signal received;

3) performing channel estimation according to the training sequence extracted, obtaining an estimated channel response, and obtaining at least one channel estimation window activated according to the estimated channel response; and 4) searching for a channelization code corresponding to each of the at least one channel estimation window activated first according to the relation between the at least one channel estimation window and the channelization code that is established, obtaining at least one code channel activated, and performing multiuser detection on the at least one code channel activated that is obtained.

The process of establishing the relation between the at least one channel estimation window and the channelization code includes: establishing the relation between the at least one channel estimation window and the channelization code in the case that the maximum number of the channel estimation windows K=16;

when the spread factor is 16, establishing a one-to-one relation between each channel estimation window and the channelization code;

when the spread factor is not 16, establishing a relation between each channelization code and several channel estimation windows, wherein the channel estimation windows comprise the channel estimation windows of all the sub-spread spectrum code branches of a spread spectrum code branch in which the node exists.

The process of establishing the relation between the at least one channel estimation window and the channelization code comprises: establishing the relation between the at least one channel estimation window and the channelization code in the case that the maximum number of the channel estimation windows K=8;

when the spread factor is 16, establishing a relation between each channel estimation window and two channelization codes;

when the spread factor is not 16, establishing a relation between each channelization code and several channel estimation windows, wherein the several channel estimation windows comprise the channel estimation windows of all the sub-spread spectrum code branches of a spread spectrum code branch in which the node exists.

The invention provides another method for code channel allocation in a wireless communication system, which includes:

establishing a relation between at least one channel estimation window and a channelization code number, wherein the channelization code number to be involved in transmission corresponds to one window combination, the window combination comprises one or more channel estimation windows; and performing code channel allocation according to the relation established.

When establishing the relation between the at least one channel estimation window and the channelization code number in the case that the maximum number of the channel estimation windows K=16, each window combination comprises one channel estimation window, and the channel estimation window comprised in each window combination is unique.

The process of establishing the relation between the at least one channel estimation window and the channelization code number comprises: establishing a relation between the at least one channel estimation window and the channelization code number in the case that the maximum number of the channel estimation windows K=8;

when the number of the transmitted code channel is less than or equal to 8, establishing a relation between the channelization code number to be involved in transmission and a window combination, wherein each window combination comprises a channel estimation window;

when the number of the transmitted code channel is greater than 8, establishing a relation between one window combination and one channelization code number involved in transmission, wherein each window combination is unique, and each window combination comprises a plurality of channel estimation windows.

The process of establishing the relation between the at least one channel estimation window and the channelization code number comprises: establishing a relation between the at least one channel estimation window and the channelization code number in the case that K is any even number between 2-16;

when the number of the transmitted code channel is less than or equal to K, establishing a relation between each channelization code number to be involved in transmission and a window combination, wherein each window combination comprises one channel estimation window;

when the number of the transmitted code channel is greater than K, establishing a relation between each channelization code number involved in transmission and a window combination, wherein each window combination comprises a plurality of channel estimation windows, K is the maximum number of channel estimation windows.

The invention provides another method for multiuser detection, which includes:

1) establishing a relation between at least one channel estimation window and a channelization code number, performing code channel allocation according to the relation established, and saving information of a code channel allocated on a transmitting end and a receiving end respectively; establishing a relation between the number of the code channels to be involved in transmission and a window combination, wherein the window combination comprises one or more channel estimation windows;

2) receiving, by the receiving end, a wireless signal containing multiple users, and extracting a training sequence from the wireless signal received;

3) performing channel estimation according to the training sequence that is extracted, obtaining an estimated channel response, and obtaining the at least one channel estimation window that is activated according to the estimated channel response; and 4) searching for the channelization code number corresponding to the at least one channel estimation window activated first according to the relation between the at least one channel estimation window and the channelization code number that is established, obtaining the at least one activated code channel, and then performing multiuser detection on the activated at least one code channel obtained.

Wherein, the at least one code channel detected by the receiving end completely corresponds to the at least one code channel transmitted on the transmitting end.

The process of establishing the relation between the at least one channel estimation window and the channelization code number comprises: establishing a relation between the at least one channel estimation window and the channelization code number in the case that K is 16, wherein each window combination that has a one-to-one relation with the channelization code number comprises one channel estimation window, and the channel estimation window comprised in each window combination is unique.

the process of establishing the relation between the at least one channel estimation window and the channelization code number comprises: establishing a relation between the at least one channel estimation window and the channelization code number in the case that K is 8;

when the code channel number involved in transmission is less than or equal to 8, establishing a relation between the channelization code number that is involved in transmission and a window combination, wherein each window combination comprises one channel estimation window;

when the code channel number involved in transmission is greater than 8, establishing a relation between one window combination and one channelization code number that is involved in transmission, wherein each window combination is unique, and each window combination comprises a plurality of channel estimation windows, wherein K is the maximum number of channel estimation windows.

In the invention, when code channel allocation is performed in the Default mode, a one-to-many relation between the channelization code and the at least one channel estimation window is established. Therefore, during the multiuser detection, the channelization code may be exactly known via at least one channel estimation window that is activated. Thereby, the efficiency of multiuser detection may be increased.

In the invention, in the Common mode, a one-to-one relation between the channelization code number and the window combination (each window combination includes one or more channel estimation windows) is established. Therefore, during the multiuser detection, the channelization code number that is involved in transmission may be exactly known via at least one channel estimation window that is activated, and then the exact code channel involved in transmission may be known according to the result of a matched filtering. Thereby, the efficiency of the multiuser detection may be increased.

DETAILED DESCRIPTION OF THE EMBODIMENTS

To make the principles, characteristics and advantages of the invention more apparent, the invention will now be further described in detail in conjunction with the drawings and the embodiments.

Because during the existing code channel allocation in the Default mode, a many-to-one relation is established between at least one channelization code and the channel estimation window, the at least one channelization code determined with the channel estimation window activated is not unique during the multiuser detection, and the difficulty in the multiuser detection is increased thereby. Therefore, in the invention, when code channel allocation is performed in the Default mode, a one-to-many relation between the channelization code and at least one channel estimation window is established. Thus, during the multiuser detection, the channelization code may be known exactly via the at least one channel estimation window that is activated. Thereby, the efficiency of multiuser detection may be increased.

Moreover, during the existing code channel allocation in the Common mode, one channel estimation window corresponds to a plurality of channelization code numbers. Therefore, during the multiuser detection, the channelization code number cannot be exactly determined with the channel estimation window activated, and the difficulty of multiuser detection may be increased thereby. Therefore, in the invention, a one-to-one relation between the channelization code number and the window combination (each window combination includes one or more channel estimation windows) is established in the Common mode. Thus during the multiuser detection, the exact channelization code number may be known with the at least one channel estimation window activated, and then the exact transmitted code channels may be known according to the result of matched filtering, so that the efficiency of multiuser detection may be increased.

Now, the method for code channel allocation and the corresponding method for multiuser detection of the invention in two allocation modes will be described in detail.

The invention discloses a method for code channel allocation in a wireless communication system in the Default mode, which includes the following steps: a relation between at least one channel estimation window and the channelization code is established, wherein the at least one channel estimation window corresponding to each channelization code includes the channel estimation windows occupied by all the sub-walsh branches of a node in which the channelization code exists.

At present, K (K is the maximum number of channel estimation windows) defined in the communication standard may be any even number between 2-16. However, when during a practical system development, usually only K=16 or K=8 is adopted. The relation between the at least one channel estimation window and the channelization code in the case of K=16 will now be introduced first:

a1: When the spread factor is 16, a one-to-one relation exists between the channelization code and the channel estimation window;

a2: When the spread factor is not 16, each channelization code corresponds to several channel estimation windows, and the several channel estimation windows include the channel estimation windows of all the sub-walsh branches of the walsh branch in which the node exists, wherein, K is the maximum number of the channel estimation windows.

Figure 2:
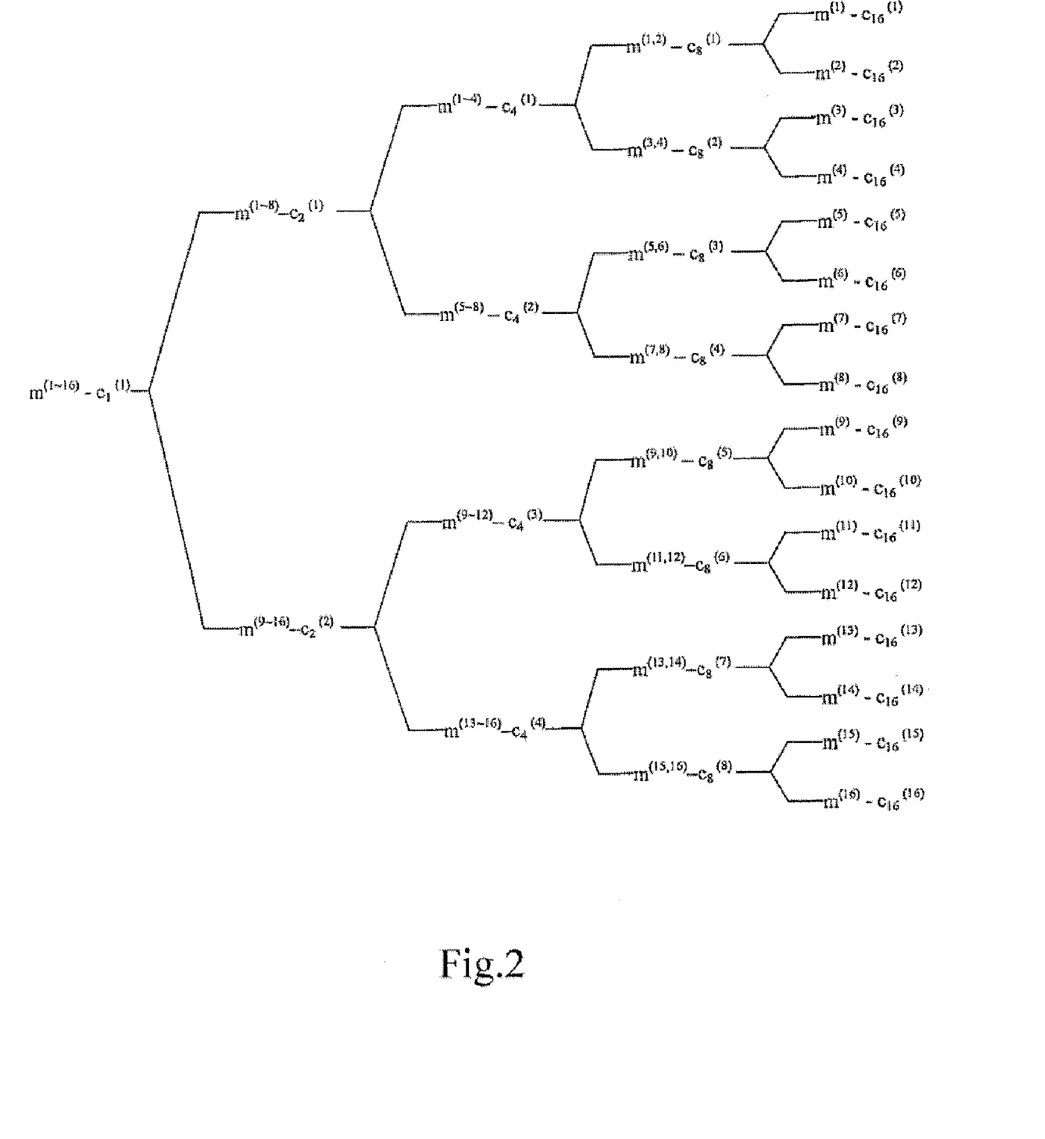
FIG. 2 is a schematic diagram of the code channel allocation in the Default mode when K=16 according to the invention.

FIG. 2 is a schematic diagram of the code channel allocation in the Default mode when K=16 according to the invention. Referring to FIG. 2, it is a schematic diagram of a code channel allocation in the Default mode in the case of K=16. When the spread factor is 16, a one-to-one relation exists between the channelization code and the channel estimation window. When the spread factor is 8, each channelization code corresponds to 2 channel estimation windows, and these 2 channel estimation windows consist of the channel estimation windows of all the sub-walsh branches of the walsh branch in which this node exists. When the spread factor is 4, each channelization code corresponds to 4 channel estimation windows, and these 4 channel estimation windows consist of the channel estimation windows of all the sub-walsh branches of the walsh branch in which this node exists. When the spread factor is 2, each channelization code corresponds to 8 channel estimation windows, and these 8 channel estimation windows consist of the channel estimation windows of all the sub-walsh branches of the walsh branch in which this node exists. When the spread factor is 1, the channelization code corresponds to all the channel estimation windows. For example, for $C_8^{(2)}$, (it has two sub-walsh branches $C_{16}^{(3)}$ and $C_{16}^{(4)}$, wherein the channel estimation window corresponding to $C_{16}^{(3)}$ is $m^{(3)}$, and the channel estimation window corresponding to $C_{16}^{(4)}$ is $m^{(4)}$. Therefore, the two channel estimation windows corresponding to $C_8^{(2)}$ are channel estimation windows $m^{(3)}$ and $m^{(4)}$ corresponding to its sub-walsh branches.

Figure 3:
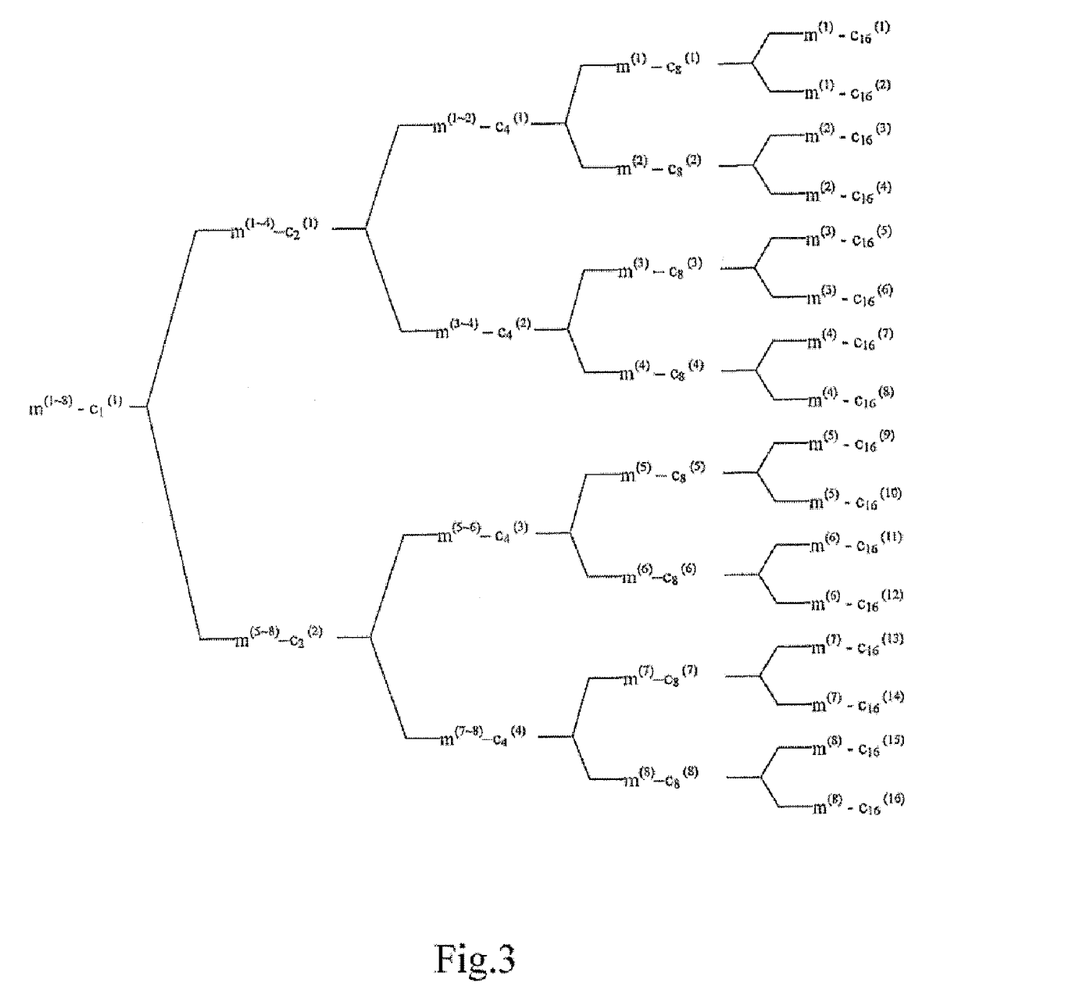
FIG. 3 is a schematic diagram of the code channel allocation in the Default mode when K=8 according to the invention.

A relation between the at least one channel estimation window and the channelization code in the case that K is 8 is as shown in FIG. 3, which includes:

b1: When the spread factor is 16, a relation between each channel estimation window and two channelization codes is established. When the spread factor is 16, because there are no sufficient channel estimation windows, two channelization codes correspond to 1 channel estimation window, which is the same as the definition in the existing standard.

b2: When the spread factor is not 16, each channelization code corresponds to several channel estimation windows, and the several channel estimation windows consist of the channel estimation windows of all the sub-walsh branches of the walsh branch in which the node exists, wherein K is the maximum number of the channel estimation windows.

In this embodiment, when SF=16, the optimal allocation mode is to establish a relation between each channel estimation window and two channelization codes with adjacent sequence numbers; in other words, the channel estimation window $m^{(i)}$ corresponds respectively to two channelization codes $C_{16}^{(2i-1)}$ and $C_{16}^{(2i)}$ whose sequence numbers are adjacent. Thus, when the spread factor is 8, a one-to-one relation exists between the channelization code and the channel estimation window; when the spread factor is 4, each channelization code corresponds to 2 channel estimation windows, and the 2 channel estimation windows consist of the channel estimation windows of all the sub-walsh branches of the walsh branch in which the node exists; when the spread factor is 2, each channelization code corresponds to 4 channel estimation windows, and the 4 channel estimation windows consist of the channel estimation windows of all the sub-walsh branches of the walsh branch in which the node exists; when the spread factor is 1, the channelization code corresponds to all the channel estimation windows.

An exemplary allocation method of the invention is illustrated above. However, the invention is not limited to the above allocation method that is implemented. Now, the establishment of the relation between the at least one channel estimation window and the channelization code when K is any even number between 2-16 during a code channel allocation process will be illustrated:

c1: When the spread factor is 16, a one-to-one relation between K channel estimation windows and K channelization codes is established, then at least 1 channel estimation window is further selected from the K channel estimation windows to establish a relation with the remaining (16−K) channelization codes;

c2: When the spread factor is not 16, each channelization code corresponds to several channel estimation windows, and the several channel estimation windows consist of the channel estimation windows of all the sub-walsh branches of the walsh branch in which the node exists, wherein K is the maximum number of the channel estimation windows.

Figure 4:
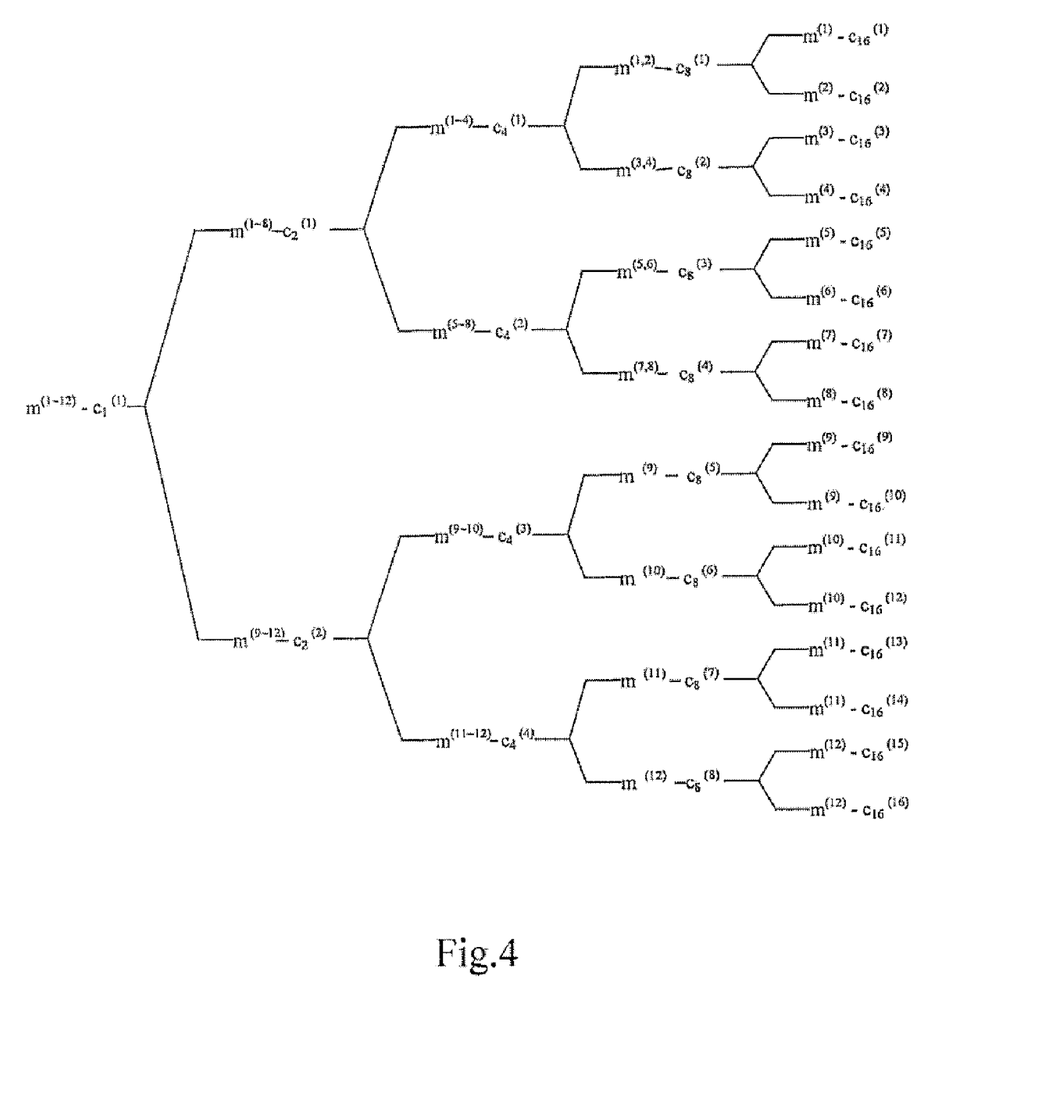
FIG. 4 is a schematic diagram of the code channel allocation in the Default mode when K=12 according to the invention.

The process to establish a relation between the channel estimation window and the channelization code is illustrated by taking K=12 as an example. Referring to FIG. 4, it shows a relation between the channel estimation window and the channelization code in the case of K=12. When SF=16, a relation between 16 channelization codes and 12 channel estimation windows needs to be established. Apparently, there are no sufficient channel estimation windows to establish a one-to-one relation with 16 channelization codes. Therefore, the relation between the at least one channel estimation window and 16 channelization codes may be established with the following two principles: (1) a one-to-one relation between 12 channel estimation windows and 12 channelization codes respectively is first established, and then a relation is established between 4 channel estimation windows selected from the 12 channel estimation windows and the remaining 4 channelization codes; (2) 4 channel estimation windows $m^{(i)}$ correspond respectively to two channelization codes $C_{16}^{(i)}$ and $C_{16}^{(i+1)}$ whose sequence numbers are adjacent. FIG. 4 shows a relation allocated according to the above two principles. Such a relation may lower the computational complexity of the subsequent multiuser detection.

Figure 5:
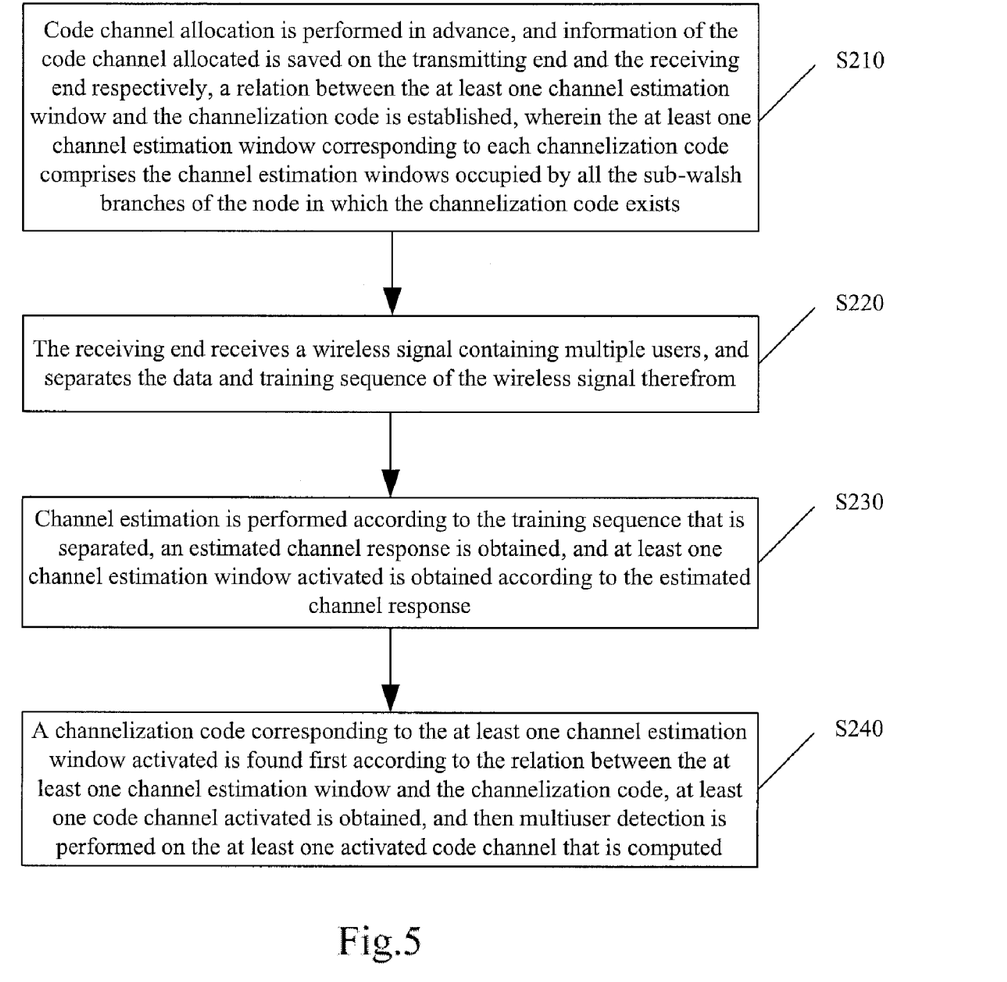
FIG. 5 is a flow chart of the method for multiuser detection based on the Default mode according to the invention.

Based on the above method for code channel allocation, the invention further provides a method for multiuser detection based on the Default mode. FIG. 5 is a flow chart of the method for multiuser detection based on the Default mode according to the invention. Referring to FIG. 5, the method for multiuser detection includes the following steps:

S210: Code channel allocation is performed in advance, and information of the code channel allocated is saved on the transmitting end and the receiving end respectively. The method for code channel allocation includes: establishing a relation between the at least one channel estimation window and the channelization code, wherein the at least one channel estimation window corresponding to each channelization code includes the channel estimation windows occupied by all the sub-walsh branches of the node in which the channelization code exists.

For example, the system may perform code channel allocation at the beginning of establishing an uplink or downlink, and establish a relation between the at least one channel estimation window and the channelization code. Because two kinds of number of channel estimation windows, i.e. K=16 and K=8, are usually employed, a relation between the at least one channel estimation window and the channelization code in these two cases may be preestablished.

S220: The receiving end receives a wireless signal containing multiple users, and extracts the data and training sequence of the wireless signal therefrom.

The transmitting end sends the information in a burst mode, and the information in each burst consists of data parts, a training sequence part and a guard interval. When the receiving end receives a wireless signal, it first extracts the data parts and the training sequence part from the wireless signal received. The training sequence part is used for performing channel estimation and obtaining a channel response.

S230: Channel estimation is performed according to the training sequence that is extracted, an estimated channel response is obtained, and at least one channel estimation window activated is obtained according to the estimated channel response.

There are many modes for implementing step S230. For example, a joint channel response corresponding to the wireless signal is obtained, and the joint channel response is partitioned into channel estimation windows according to the window length, then it is determined whether the signal power of each channel estimation window is greater than a predetermined threshold. A channel estimation window whose signal power is greater than the predetermined threshold is an activated channel estimation window. If the channel estimation window is in activated status, it is indicated that the user who occupies the window has data for transmission, and the user needs to participate in the multiuser detection; otherwise, it is indicated that the user who occupies the window has no data for transmission, or the user has data for transmission but the data are weakened due to shaping attenuation or channel fading, so that the signal component of the user on the receiving end is very weak, and the user does not need to participate in the multiuser detection.

S240: A channelization code corresponding to each of the at least one channel estimation window activated is found first according to the relation between the at least one channel estimation window and the channelization code in step S210, an activated code channel is obtained, and then the multiuser detection is performed on the at least one activated code channel that is found out.

The above method for multiuser detection will now be illustrated in conjunction with specific embodiments.

It is supposed that K=8, and the transmitting end and the receiving end establish a relation between the at least one channel estimation window and the channelization code according to the allocation mode shown in FIG. 3.

Moreover, 3 users access the current cell, wherein $c_2^{(1)}$ is allocated to user 1, $c_4^{(3)}$ is allocated to user 2, and $c_8^{(7)}$ is allocated to user 3. The receiver of the base station is preinformed of the code channel allocation information of the current accessing users, and the receiver of the terminal also saves its own code channel allocation information.

However, during the practical sending process, user 1 sends $c_4^{(1)}$ practically, and the $1^{st}$ and the $2^{nd}$ channel estimation windows are thereby occupied; user 2 sends $c_8^{(5)}$ practically, and the $5^{th}$ channel estimation window is thereby occupied; user 3 sends $c_{16}^{(13)}$ practically, and the $7^{th}$ channel estimation window is thereby occupied.

On the receiving end, the receiver performs channel estimation with a training sequence and obtains at least one channel estimation window activated. In an ideal case, the activated at least one channel estimation window that is detected by the receiving end is actually the channel estimation window that is practically occupied by the transmitting end. Supposing that the receiving end detects that the $1^{st}$, $2^{nd}$, $5^{th}$ and $7^{th}$ channel estimation windows are activated, then for the existing standard, referring to FIG. 1, the receiver may perform multiuser detection with $c_2^{(1)}$, $c_4^{(3)}$ and $c_8^{(7)}$. For the present invention, referring to FIG. 3, the receiver may perform multiuser detection with $c_4^{(1)}$, $c_8^{(5)}$ and $c_8^{(7)}$. In comparison with $c_4^{(1)}$, $c_2^{(1)}$ corresponds to 8 virtual code channels with a spread factor of 16, while $c_4^{(1)}$ corresponds to 4 virtual code channels with a spread factor of 16. In comparison with $c_8^{(5)}$, $c_4^{(3)}$ corresponds to 4 virtual code channels with a spread factor of 16, while $c_8^{(5)}$ corresponds to 2 virtual code channels with a spread factor of 16. In comparison with $c_{16}^{(13)}$, $c_8^{(7)}$ corresponds to 2 virtual code channels with a spread factor of 16, while $c_{16}^{(13)}$ corresponds to 1 virtual code channels with a spread factor of 16. Therefore, during the detection process of the allocation mode in the existing standard, the interference of (4+2+1)=7 virtual code channels with a spread factor of 16 is introduced, wherein the total number of the interfering code channels is the same as the total code channel number expected. In contrast, during the detection process of the allocation mode in the invention, only the interference of 1 virtual code channel with a spread factor of 16 is introduced, the total number of the interfering code channel is only 1/7 of the total code channel number expected, thus the performance of multiuser detection may be improved greatly.

The invention further discloses a method for code channel allocation in a wireless communication system in the Common mode, which includes: establishing a relation between at least one channel estimation window and the channelization code number, wherein the number of the transmitted code channel corresponds to a unique window combination, and the window combination includes one or more channel estimation windows.

At present, K (K is the maximum number of channel estimation windows) defined in the communication standard may be any even number between 2-16. However, in the practical application of the system, K=16 or K=8 is usually adopted. The relation between the channel estimation window and the channelization code in the case of K=16 will now be introduced first, wherein each window combination includes a channel estimation window, and the channel estimation window included in each window combination is unique. Referring to Table 2, it shows the code channel allocation in a wireless communication system in the Common mode when K=16.

TABLE 2

| m1 | m2 | m3 | m4 | m5 | m6 | m7 | m8 | m9 | m10 | m11 | m12 | m13 | m14 | m15 | m16 | Channelization Code Number |
|----|----|----|----|----|----|----|----|----|-----|-----|-----|-----|-----|-----|-----|---------------------------|
| 1 | 0 | 0 | 0 | 0 | 0 | 0 | 0 | 0 | 0 | 0 | 0 | 0 | 0 | 0 | 0 | 1 code |
| 0 | 1 | 0 | 0 | 0 | 0 | 0 | 0 | 0 | 0 | 0 | 0 | 0 | 0 | 0 | 0 | 2 codes |
| 0 | 0 | 1 | 0 | 0 | 0 | 0 | 0 | 0 | 0 | 0 | 0 | 0 | 0 | 0 | 0 | 3 codes |
| 0 | 0 | 0 | 1 | 0 | 0 | 0 | 0 | 0 | 0 | 0 | 0 | 0 | 0 | 0 | 0 | 4 codes |
| 0 | 0 | 0 | 0 | 1 | 0 | 0 | 0 | 0 | 0 | 0 | 0 | 0 | 0 | 0 | 0 | 5 codes |
| 0 | 0 | 0 | 0 | 0 | 1 | 0 | 0 | 0 | 0 | 0 | 0 | 0 | 0 | 0 | 0 | 6 codes |
| 0 | 0 | 0 | 0 | 0 | 0 | 1 | 0 | 0 | 0 | 0 | 0 | 0 | 0 | 0 | 0 | 7 codes |
| 0 | 0 | 0 | 0 | 0 | 0 | 0 | 1 | 0 | 0 | 0 | 0 | 0 | 0 | 0 | 0 | 8 codes |
| 0 | 0 | 0 | 0 | 0 | 0 | 0 | 0 | 1 | 0 | 0 | 0 | 0 | 0 | 0 | 0 | 9 codes |
| 0 | 0 | 0 | 0 | 0 | 0 | 0 | 0 | 0 | 1 | 0 | 0 | 0 | 0 | 0 | 0 | 10 codes |
| 0 | 0 | 0 | 0 | 0 | 0 | 0 | 0 | 0 | 0 | 1 | 0 | 0 | 0 | 0 | 0 | 11 codes |
| 0 | 0 | 0 | 0 | 0 | 0 | 0 | 0 | 0 | 0 | 0 | 1 | 0 | 0 | 0 | 0 | 12 codes |
| 0 | 0 | 0 | 0 | 0 | 0 | 0 | 0 | 0 | 0 | 0 | 0 | 1 | 0 | 0 | 0 | 13 codes |
| 0 | 0 | 0 | 0 | 0 | 0 | 0 | 0 | 0 | 0 | 0 | 0 | 0 | 1 | 0 | 0 | 14 codes |
| 0 | 0 | 0 | 0 | 0 | 0 | 0 | 0 | 0 | 0 | 0 | 0 | 0 | 0 | 1 | 0 | 15 codes |
| 0 | 0 | 0 | 0 | 0 | 0 | 0 | 0 | 0 | 0 | 0 | 0 | 0 | 0 | 0 | 1 | 16 codes |

The process for establishing a relation between the at least one channel estimation window and the channelization code number further includes: establishing a relation between the at least one channel estimation window and the channelization code number in the case that K is 8:

when the number of the transmitted code channel is less than or equal to 8, the channelization code number that is involved in transmission corresponds to a unique window combination, and each window combination includes a channel estimation window;

when the number of the transmitted code channel is greater than 8, one window combination corresponds to one channelization code number that is involved in transmission, each window combination is unique, and each window combination consists of a plurality of channel estimation windows. Referring to Table 3, it shows the code channel allocation in a wireless communication system in the Common mode in the case that K is 8.

TABLE 3

| m1 | m2 | m3 | m4 | m5 | M6 | m7 | m8 | Channelization Code Number |
|----|----|----|----|----|----|----|----|---------------------------|
| 1 | 0 | 0 | 0 | 0 | 0 | 0 | 0 | 1 code |
| 0 | 1 | 0 | 0 | 0 | 0 | 0 | 0 | 2 codes |
| 0 | 0 | 1 | 0 | 0 | 0 | 0 | 0 | 3 codes |
| 0 | 0 | 0 | 1 | 0 | 0 | 0 | 0 | 4 codes |
| 0 | 0 | 0 | 0 | 1 | 0 | 0 | 0 | 5 codes |
| 0 | 0 | 0 | 0 | 0 | 1 | 0 | 0 | 6 codes |
| 0 | 0 | 0 | 0 | 0 | 0 | 1 | 0 | 7 codes |
| 0 | 0 | 0 | 0 | 0 | 0 | 0 | 1 | 8 codes |
| 1 | 0 | 0 | 0 | 0 | 0 | 0 | 1 | 9 codes |
| 0 | 1 | 0 | 0 | 0 | 0 | 0 | 1 | 10 codes |
| 0 | 0 | 1 | 0 | 0 | 0 | 0 | 1 | 11 codes |
| 0 | 0 | 0 | 1 | 0 | 0 | 0 | 1 | 12 codes |
| 0 | 0 | 0 | 0 | 1 | 0 | 0 | 1 | 13 codes |
| 0 | 0 | 0 | 0 | 0 | 1 | 0 | 1 | 14 codes |
| 0 | 0 | 0 | 0 | 0 | 0 | 1 | 1 | 15 codes |
| 1 | 0 | 0 | 0 | 0 | 0 | 1 | 0 | 16 codes |

The above allocation method is a code channel allocation mode in the Common mode according to the invention, wherein each channelization code number in the channelization code numbers between 9-16 may correspond to a window combination, and the window combination may include two channel estimation windows, or it may include three or even more channel estimation windows. In addition, Table 3 discloses a window combination that includes one to two channel estimation windows. However, the channel estimation windows included in each window combination may be different. For example, the window combination corresponding to channelization code number 9 includes the first channel estimation window and the eighth channel estimation window. Actually, the window combination corresponding to channelization code number 9 may include any other two channel estimation windows. During the code channel allocation, the principle to be taken into account is that each channelization code number corresponds to one window combination, wherein the window combination may include one or more channel estimation windows, but each window combination is unique.

The process for establishing a relation between the at least one channel estimation window and the channelization code number includes: establishing a relation between the at least one channel estimation window and the channelization code number in the case that K is any even number between 2-16;

when the number of the transmitted code channel is less than or equal to K, each channelization code number involved in transmission corresponds to a unique window combination, and each window combination includes a channel estimation window;

when the number of the transmitted code channel is greater than K, each channelization code number involved in transmission corresponds to a unique window combination, and each window combination includes a plurality of channel estimation windows.

Referring to Table 4, it shows the code channel allocation in a wireless communication system in the Common mode in the case of K=12.

Figure 6:
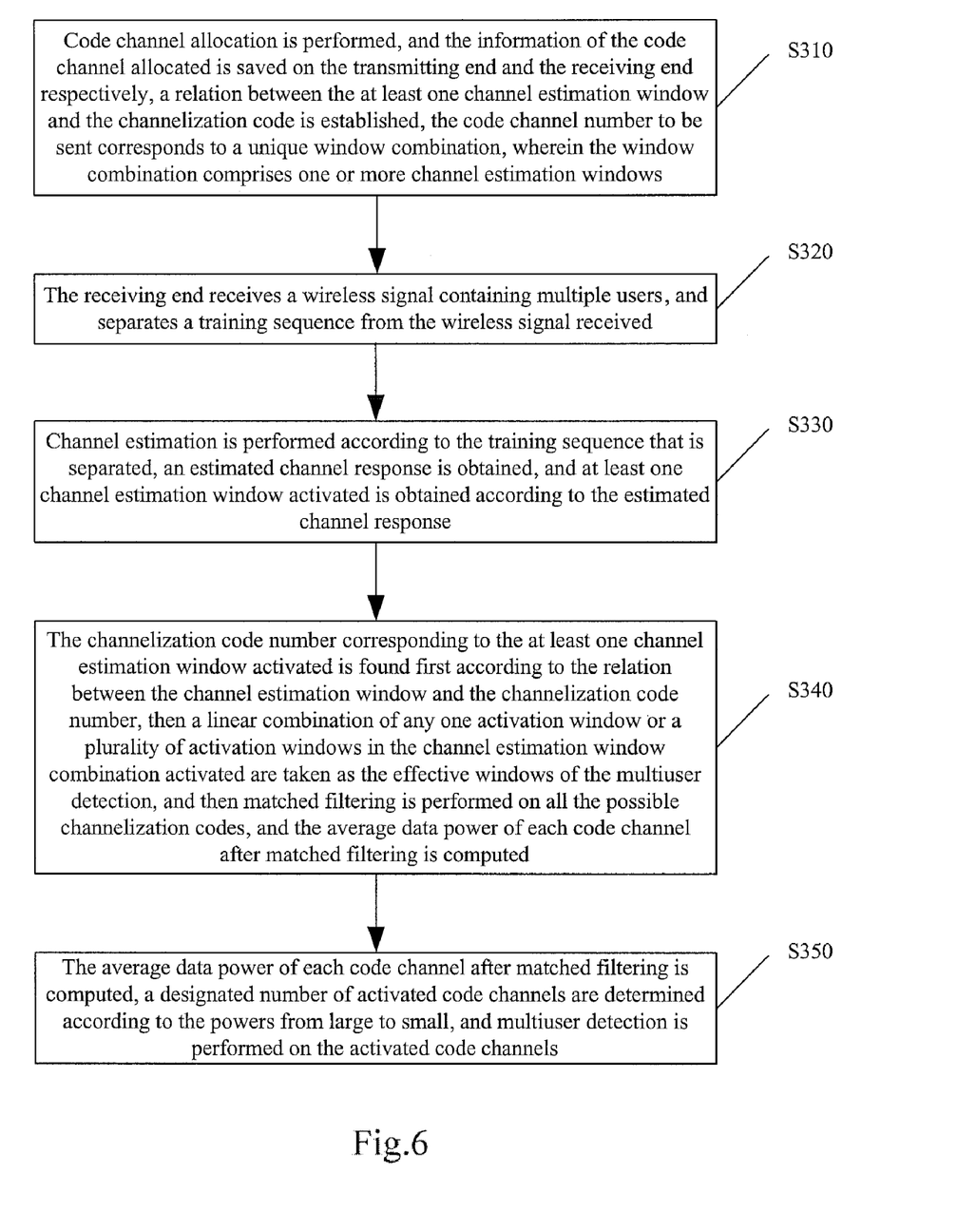
FIG. 6 is a flow chart of the method for multiuser detection based on the Common mode according to the invention.

S310: A relation between the at least one channel estimation window and the channelization code is established, the code channel allocation is performed according to the relation established, and the information of the code channel allocated is saved on the transmitting end and the receiving end respectively; the code channel number to be involved in transmission corresponds to a window combination, wherein the window combination includes one or more channel estimation windows.

The at least one code channel detected by the receiving end corresponds completely to the at least one transmitted code channel on the transmitting end. For example, the system may perform code channel allocation at the beginning of an uplink or downlink establishment process, and establish a relation between the at least one channel estimation window and the channelization code number. Because two kinds of number of channel estimation windows, K=16 and K=8, are usually employed, a relation between the at least one channel estimation window and the channelization code number in these two cases may be preestablished.

S320: The receiving end receives a wireless signal containing multiple users, and extracts a training sequence from the wireless signal received.

The transmitting end transmits the information in burst mode, wherein each burst consists of data parts, a training sequence part and a guard interval. When the receiving end receives a wireless signal, the data parts and the training sequence part is firstly extracted from the wireless signal received. The training sequence part is used for performing channel estimation and obtaining a channel response.

S330: Channel estimation is performed according to the training sequence that is extracted, an estimated channel

TABLE 4

| m1 | m2 | m3 | m4 | m5 | m6 | m7 | m8 | m9 | m10 | m11 | m12 | Channelization Code Number |
|----|----|----|----|----|----|----|----|----|-----|-----|-----|----------------------------|
| 1  | 0  | 0  | 0  | 0  | 0  | 0  | 0  | 0  | 0   | 0   | 0   | 1 code                     |
| 0  | 1  | 0  | 0  | 0  | 0  | 0  | 0  | 0  | 0   | 0   | 0   | 2 codes                    |
| 0  | 0  | 1  | 0  | 0  | 0  | 0  | 0  | 0  | 0   | 0   | 0   | 3 codes                    |
| 0  | 0  | 0  | 1  | 0  | 0  | 0  | 0  | 0  | 0   | 0   | 0   | 4 codes                    |
| 0  | 0  | 0  | 0  | 1  | 0  | 0  | 0  | 0  | 0   | 0   | 0   | 5 codes                    |
| 0  | 0  | 0  | 0  | 0  | 1  | 0  | 0  | 0  | 0   | 0   | 0   | 6 codes                    |
| 0  | 0  | 0  | 0  | 0  | 0  | 1  | 0  | 0  | 0   | 0   | 0   | 7 codes                    |
| 0  | 0  | 0  | 0  | 0  | 0  | 0  | 1  | 0  | 0   | 0   | 0   | 8 codes                    |
| 0  | 0  | 0  | 0  | 0  | 0  | 0  | 0  | 1  | 0   | 0   | 0   | 9 codes                    |
| 0  | 0  | 0  | 0  | 0  | 0  | 0  | 0  | 0  | 1   | 0   | 0   | 10 codes                   |
| 0  | 0  | 0  | 0  | 0  | 0  | 0  | 0  | 0  | 0   | 1   | 0   | 11 codes                   |
| 0  | 0  | 0  | 0  | 0  | 0  | 0  | 0  | 0  | 0   | 0   | 1   | 12 codes                   |
| 1  | 0  | 0  | 0  | 0  | 0  | 0  | 0  | 0  | 0   | 0   | 1   | 13 codes                   |
| 0  | 1  | 0  | 0  | 0  | 0  | 0  | 0  | 0  | 0   | 0   | 1   | 14 codes                   |
| 0  | 0  | 1  | 0  | 0  | 0  | 0  | 0  | 0  | 0   | 0   | 1   | 15 codes                   |
| 0  | 0  | 0  | 1  | 0  | 0  | 0  | 0  | 0  | 0   | 0   | 1   | 16 codes                   |

A relation between the at least one channel estimation window and the channelization code number is established based on the above code channel allocation mode, wherein any channelization code number corresponds to a unique window combination. During the multiuser detection, the channelization code number can be known exactly as long as the at least one channel estimation window activated is obtained.

Based on the method for code channel allocation disclosed above, the invention further provides a method for multiuser detection in the Common mode. Referring to FIG. 6, it is a flow chart of the method for multiuser detection based on the Common mode according to the invention, which includes the following steps:

response is obtained, and at least one channel estimation window activated is obtained according to the estimated channel response.

There are many methods for implementing step S330. For example, a joint channel response corresponding to the wireless signal is obtained, and the joint channel response is partitioned into channel estimation windows according to the window length, then it is determined whether the signal power of each channel estimation window is greater than a predetermined threshold. A channel estimation window whose signal power is greater than the predetermined threshold is an activated channel estimation window. If the channel estimation window is in activated status, it indicates that the user who occupies the window has data for transmission, and the user needs to participate in the multiuser detection; otherwise, it indicates that the user who occupies the window has no data for transmission, or the user has data for transmission but the data are weakened due to beamforming attenuation or channel fading, so that the signal component of the user on the receiving end is very weak, and the user does not need to participate in the multiuser detection.

S340: The channelization code number corresponding to the at least one channel estimation windows activated is found first according to the relation between the at least one channel estimation window and the channelization code number in step S310, then any activated window or a linear combination of a plurality of the activated windows in the combination of activated channel estimation windows is taken as the effective window that participates in the multiuser detection, and then a matched filtering is performed on all the possible channelization codes (they correspond to the channelization codes with a spread factor of 16 in downlink).

S350: The average data power of each code channel after matched filtering is computed, and a specified number of activated code channels are determined according to the powers from large to small, and then the multiuser detection is performed on the activated code channels that are determined.

The above method for multiuser detection will now be illustrated in conjunction with a specific embodiment.

It is supposed that 2 code channels are involved in transmission in the base station, thus the transmitting end occupies the second channel estimation window. After the receiver performs channel estimation with a training sequence and obtains the activated channel estimation window, for the existing standard, referring to Table 1, the receiver may perform multiuser detection using 10 code channels, and 8 interfering code channels are introduced thereby, which are 4 times of the total code channel number expected, thus the performance of multiuser detection may be very poor. For the present invention, referring to Table 3, the receiver may perform multiuser detection with 2 code channels, which are totally the same as the code channels involved in transmission, thus the performance of multiuser detection is optimal.

Supposing that 9 code channels, for example $c_{16}^{(1)}$ to $c_{16}^{(9)}$, are involved in transmission in the base station, then the transmitting end occupies the $1^{st}$ and the $8^{th}$ channel estimation windows. After the receiver performs channel estimation with the training sequence and obtains the two activated channel estimation windows, a matched filtering is performed on all the spread spectrum codes ($c_{16}^{(1)}$ to $c_{16}^{(16)}$) whose spread factor is 16 with the $1^{st}$ or the $8^{th}$ channel estimation window, and the data powers of the 16 code channels after the matched filtering are computed respectively, and then the top 9 code channels with the largest data power, supposing that the corresponding channelization codes are $c_{16}^{(1)}$ to $c_{16}^{(9)}$, are selected according to the value of the data power, and the multiuser detection is performed with the 9 code channels.

It should be noted that: in a CDMA communication system, there are at least two code channel allocation modes (Default mode and Common mode). When a relation between the at least one channel estimation window and the channelization code is established in the Default mode, the at least one channel estimation window corresponding to each channelization code includes the channel estimation windows occupied by all the sub-walsh branches of the node in which the channelization code exists. When a relation between the at least one channel estimation window and the channelization code number is established in the Common mode, the code channel number that are involved in transmission corresponds to a unique window combination, wherein the window combination includes one or more channel estimation windows.

When the base station performs omnidirectional transmission to all the users in the cell so as to broadcast information, the base station usually employs the relation between the at least one channel estimation window and the channelization code number established in the Common mode. Meanwhile, for the at least one channel estimation window activated obtained from the wireless signal received, the user receiver also first finds the number of the channelization code in the Common mode, then obtains the at least one code channel activated with the result of a matched filtering, and finally performs multiuser detection on the at least one code channel activated.

When the base station and the user perform a selective transmission, the base station usually employs the relation between the at least one channel estimation window and the channelization code established in the Default mode. Meanwhile, for the at least one channel estimation window activated obtained from the wireless signal received, the user receiver also first finds the at least one channelization code in the Default mode, and then performs multiuser detection with the at least one code channel activated, corresponding to the at least one channelization code.

Additional advantages and modifications will readily occur to those skilled in the art. Therefore, the invention in its broader aspects is not limited to the specific details and representative embodiments shown and described herein. Accordingly, various modifications and variations may be made without departing from the spirit or scope of the invention as defined by the appended claims and their equivalents.

The invention claimed is:

1. A method for code channel allocation in a wireless communication system, comprising:
    establishing a relation between at least one channel estimation window and a channelization code, wherein the at least one channel estimation window corresponding to the channelization code comprises at least one channel estimation window corresponding to all the spread spectrum code branches of a node in which the channelization code exists; and
    performing code channel allocation according to the relation established,
    wherein the process of establishing the relation between at least one channel estimation window and a channelization code comprises establishing the relation between the at least one channel estimation window and the channelization code when a maximum number of the channel estimation windows K is any even number between 2-16:
    when the spread factor is 16, establishing a one-to-one relation between K channel estimation windows and K channelization codes first, then extracting at least 1 channel estimation window from the K channel estimation windows to establish a relation with the remaining 16-K channelization codes; and
    when the spread factor is less than 16, establishing a relation between each channelization code and channel estimation windows of all the sub-spread spectrum code branches of a spread spectrum code branch of a node in which the channelization code exists.

2. The method for code channel allocation according to claim 1, wherein the process of establishing the relation between the at least one channel estimation window and the channelization code when K is any even number between 2-16 comprises: establishing the relation between the at least one channel estimation window and the channelization code in the case that a maximum number of the channel estimation windows K=16;

when the spread factor is 16, establishing a one-to-one relation between the channelization code and the channel estimation window;

when the spread factor is not 16, establishing a relation between each channelization code and several channel estimation windows, wherein the channel estimation windows comprise the channel estimation windows of all the sub-spread spectrum code branches of the spread spectrum code branch in which the node exists.

3. The method for code channel allocation according to claim 1, wherein, the process of establishing the relation between the at least one channel estimation window and the channelization code when K is any even number between 2-16 comprises: establishing the relation between the at least one channel estimation window and the channelization code in the case that the maximum number of the channel estimation windows K=8;

when the spread factor is 16, establishing a relation between each channel estimation window and two channelization codes; and when the spread factor is not 16, establishing a relation between each channelization code and several channel estimation windows, wherein the several channel estimation windows comprise the channel estimation windows of all the sub-walsh branches of a walsh branch in which the node exists.

4. The method for code channel allocation according to claim 3, wherein, in the process of establishing the relation between each channel estimation window and two channelization codes, a channel estimation window $m^{(i)}$ corresponds respectively to two channelization codes $C_{16}^{(2i-1)}$ and $C_{16}^{(2i)}$ whose sequence numbers are adjacent, wherein i is the sequence number of the channel estimation window.

5. A method for multiuser detection, comprising:

establishing a relation between at least one channel estimation window and a channelization code, performing code channel allocation according to the relation, and saving information of a code channel allocated on a transmitting end and a receiving end respectively, wherein the at least one channel estimation window corresponding to the channelization code comprises at least one channel estimation window occupied by all the sub-spread spectrum code branches of a node in which the channelization code exists;

receiving, by a receiving end, a wireless signal containing multiple users, and extracting a training sequence from the wireless signal received;

performing channel estimation according to the training sequence extracted, obtaining an estimated channel response, and obtaining the at least one channel estimation window activated, according to the estimated channel response; and searching for a channelization code corresponding to each of the at least one channel estimation window activated first according to the relation between the at least one channel estimation window and the channelization code that is established, obtaining at least one code channel activated, and performing multiuser detection on the at least one code channel activated that are obtained, wherein the establishing the relation between at least one channel estimation window and a channelization code comprises establishing the relation between the at least one channel estimation window and the channelization code when a maximum number of the channel estimation windows K is any even number between 2-16:

when the spread factor is 16, establishing a one-to-one relation between K channel estimation windows and K channelization codes first, then extracting at least 1 channel estimation window from the K channel estimation windows to establish a relation with the remaining 16-K channelization codes; and when the spread factor is less than 16, establishing a relation between each channelization code and channel estimation windows of all the sub-spread spectrum code branches of a spread spectrum code branch of a node in which the channelization code exists.

6. The method for multiuser detection according to claim 5, wherein, the process of establishing the relation between the at least one channel estimation window and the channelization code when K is any even number between 2-16 comprises: establishing the relation between the at least one channel estimation window and the channelization code in the case that the maximum number of the channel estimation windows K=16;

when the spread factor is 16, establishing a one-to-one relation between each channel estimation window and the channelization code;

when the spread factor is not 16, establishing a relation between each channelization code and several channel estimation windows, wherein the channel estimation windows comprise the channel estimation windows of all the sub-spread spectrum code branches of a spread spectrum code branch in which the node exists.

7. The method for multiuser detection according to claim 5, wherein, the process of establishing a relation between at least one channel estimation window and a channelization code when K is any even number between 2-16 comprises: establishing the relation between the at least one channel estimation window and the channelization code in the case that the maximum number of the channel estimation windows K=8;

when the spread factor is 16, establishing a relation between each channel estimation window and two channelization codes;

when the spread factor is not 16, establishing a relation between each channelization code and several channel estimation windows, wherein the several channel estimation windows comprise the channel estimation windows of all the sub-spread spectrum code branches of a spread spectrum code branch in which the node exists.

8. A method for code channel allocation in a wireless communication system, comprising:

establishing a relation between at least one channel estimation window and a channelization code number, wherein the channelization code number to be involved in transmission corresponds to one window combination, the window combination comprises one or more channel estimation windows; and performing code channel allocation according to the relation established, wherein the process of establishing a relation between at least one channel estimation window and a channelization code number comprises establishing a relation between the at least one channel estimation window and the channelization code number in the case that a maximum number of channel estimation windows K is any even number between 2-16:

when the number of the transmitted code channel is less than or equal to K, establishing a relation between each channelization code number to be involved in transmission and a window combination, wherein each window combination comprises one channel estimation window; and when the number of the transmitted code channel is greater than K, establishing a relation between each channelization code number involved in transmission and a window combination, wherein each window combination comprises a plurality of channel estimation windows.

9. The method for code channel allocation according to claim 8, wherein, when establishing the relation between the at least one channel estimation window and the channelization code number in the case that the maximum number of the channel estimation windows K=16, each window combination comprises one channel estimation window, and the channel estimation window comprised in each window combination is unique.

10. The method for code channel allocation according to claim 8, wherein, the process of establishing the relation between the at least one channel estimation window and the channelization code number in the case that a maximum number of channel estimation windows K is any even number between 2-16 comprises: establishing a relation between the at least one channel estimation window and the channelization code number in the case that the maximum number of the channel estimation windows K=8;

when the number of the transmitted code channel is less than or equal to 8, establishing a relation between the channelization code number to be involved in transmission and a window combination, wherein each window combination comprises a channel estimation window;

when the number of the transmitted code channel is greater than 8, establishing a relation between one window combination and one channelization code number involved in transmission, wherein each window combination is unique, and each window combination comprises a plurality of channel estimation windows.

11. A method for multiuser detection, comprising:
1) establishing a relation between at least one channel estimation window and a channelization code number, performing code channel allocation according to the relation established, and saving information of a code channel allocated on a transmitting end and a receiving end respectively; establishing a relation between the number of the code channel number to be involved in transmission and a window combination, wherein the window combination comprises one or more channel estimation windows;
2) receiving, by the receiving end, a wireless signal containing multiple users, and extracting a training sequence from the wireless signal received;
3) performing channel estimation according to the training sequence that is extracted, obtaining an estimated channel response, and obtaining at least one channel estimation window that is activated according to the estimated channel response; and
4) searching for the channelization code number corresponding to the at least one channel estimation window activated first according to the relation between the at least one channel estimation window and the channelization code number that is established, obtaining at least one activated code channel, and then performing multiuser detection on the at least one activated code channel obtained, wherein the process of establishing a relation between at least one channel estimation window and a channelization code number comprises establishing a relation between the at least one channel estimation window and the channelization code number in the case that a maximum number of channel estimation windows K is any even number between 2-16;

when the number of the transmitted code channel is less than or equal to K, establishing a relation between each channelization code number to be involved in transmission and a window combination, wherein each window combination comprises one channel estimation window; and when the number of the transmitted code channel is greater than K, establishing a relation between each channelization code number involved in transmission and a window combination, wherein each window combination comprises a plurality of channel estimation windows.

12. The method for multiuser detection according to claim 11, wherein, the at least one code channel detected by the receiving end completely corresponds to the transmitted code channels on the transmitting end.

13. The method for multiuser detection according to claim 11, wherein, the process of establishing the relation between the at least one channel estimation window and the channelization code number in the case that a maximum number of channel estimation windows K is any even number between 2-16 comprises: establishing a relation between the at least one channel estimation window and the channelization code number in the case that K is 16, wherein each window combination that has a one-to-one relation with the channelization code number comprises one channel estimation window, and the channel estimation window comprised in each window combination is unique, wherein K is the maximum number of channel estimation windows.

14. The method for multiuser detection according to claim 11 wherein, the process of establishing the relation between the at least one channel estimation window and the channelization code number in the case that a maximum number of channel estimation windows K is any even number between 2-16 comprises: establishing a relation between the at least one channel estimation window and the channelization code number in the case that K is 8;

when the code channel number involved in transmission is less than or equal to 8, establishing a relation between the channelization code number that is involved in transmission and a window combination, wherein each window combination comprises one channel estimation window;

when the code channel number involved in transmission is greater than 8, establishing a relation between one window combination and one channelization code number that is involved in transmission, wherein each window combination is unique, and each window combination comprises a plurality of channel estimation windows, wherein K is the maximum number of channel estimation windows.

* * * * *